US008939771B2

(12) United States Patent
Owens, III

(10) Patent No.: US 8,939,771 B2
(45) Date of Patent: Jan. 27, 2015

(54) TAXIDERMY FLESH REMOVAL SYSTEM AND METHOD

(76) Inventor: William W. Owens, III, Eros, LA (US)

( * ) Notice: Subject to any disclaimer, the term of this patent is extended or adjusted under 35 U.S.C. 154(b) by 1043 days.

(21) Appl. No.: 12/592,363

(22) Filed: Nov. 24, 2009

(65) Prior Publication Data

US 2011/0123970 A1 May 26, 2011

(51) Int. Cl.
*G09B 23/00* (2006.01)
*C14B 99/00* (2006.01)

(52) U.S. Cl.
CPC .................................... *C14B 99/00* (2013.01)
USPC ........................................................ 434/295

(58) Field of Classification Search
USPC ........................................................ 434/295
See application file for complete search history.

(56) References Cited

U.S. PATENT DOCUMENTS 4,993,243 A * 2/1991 Guinn .............................. 69/37
2007/0283504 A1* 12/2007 Wegner ..................... 8/94.19 R
2009/0075245 A1 3/2009 Hacke
2009/0270266 A1* 10/2009 Kelley et al. ..................... 506/9

* cited by examiner

*Primary Examiner* — Kesha Frisby
(74) *Attorney, Agent, or Firm* — R. Keith Harrison

(57) ABSTRACT

A taxidermy flesh removal system includes a system container and an electrode assembly provided in the system container and having a positive electrode and a negative electrode spaced-apart from the positive electrode.

14 Claims, 2 Drawing Sheets

TAXIDERMY FLESH REMOVAL SYSTEM AND METHOD

FIELD

The present disclosure generally relates to taxidermy preparation systems and methods. More particularly, the present disclosure relates to a taxidermy flesh removal system and method in which flesh is removed from a head or other part of a carcass by submerging the head or part in liquid and passing an electrical current through the liquid.

BACKGROUND

In the field of taxidermy, various techniques and methods are known for the preparation and preservation of game animals for display. Generally, these techniques include removal of the hide and underlying soft tissue flesh from the skull of the animal carcass; preparation of the skull for placement of either the animal's hide or an artificial hide on the skull; placement of the hide on the skull; and adjustment of the hide on the skull until it appears lifelike. Preparation of the skull prior to placing the hide on the skull may include filling in the form of the head which was lost upon removal of the flesh from the skull by placing and shaping taxidermy clay or other material in the appropriate areas on the skull. Antlers or horns may be fabricated with polyurethane or other material and attached to the skull along with placement of the hide on the skull.

Conventional techniques for removing the flesh from the skull prior to preparation of the skull of the animal carcass may include submerging the head of the carcass in boiling water typically for several hours. One of the drawbacks of this process, however, is that excessive boiling of the skull may reduce the structural integrity of the skull and in some cases, particularly if the boiling is prolonged, may cause the skull to disintegrate. During the flesh removal process, therefore, it may be necessary to remove the skull from the boiling water prior to disintegration of the skull, followed by removal of the remaining flesh from the skull using a small knife or tweezers.

Accordingly, a taxidermy flesh removal system and method are needed which facilitate the effective removal of flesh from an animal carcass skull or other part and which substantially maintains the structural integrity of the carcass skull or skeleton.

SUMMARY

The present disclosure is generally directed to a taxidermy flesh removal system. An illustrative embodiment of the system includes a system container and an electrode assembly provided in the system container and having a positive electrode and a negative electrode spaced-apart from the positive electrode.

The present disclosure is further generally directed to a method of removing flesh from a game carcass: An illustrative embodiment of the method includes providing an electrically-conductive liquid, immersing a skull or other part of an animal carcass in the electrically-conductive liquid, applying an electrical current to the electrically-conductive liquid, terminating the electrical current, removing the skull or other part of the animal carcass from the electrically-conductive liquid and removing residual flesh from the carcass.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 1:
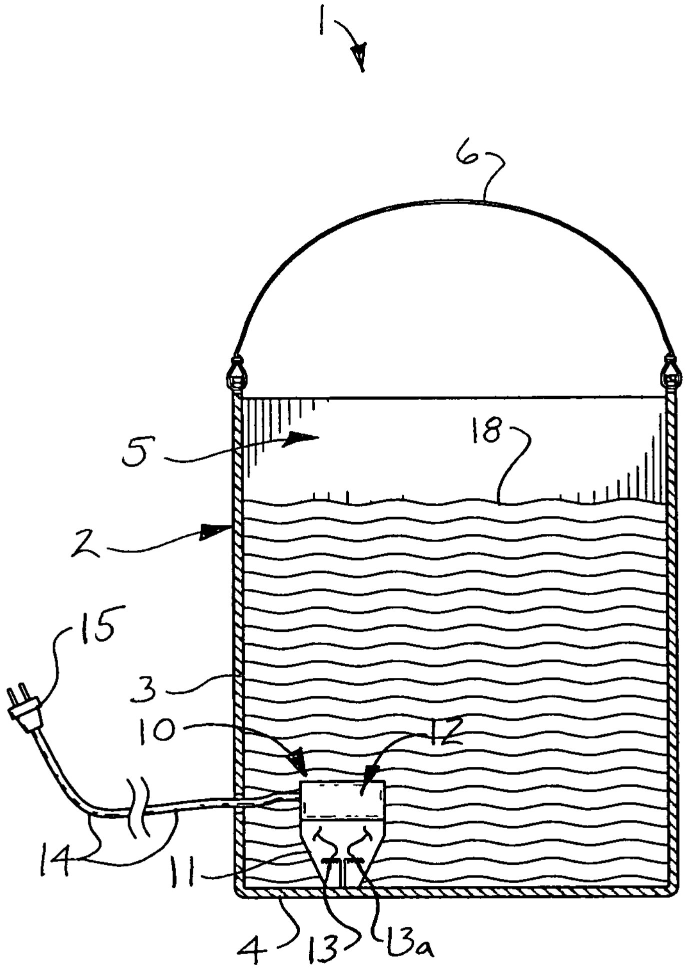
FIG. 1 is a sectional view of an illustrative embodiment of the taxidermy flesh removal system.

Referring initially to FIG. 1 of the drawings, a longitudinal sectional view of an illustrative embodiment of the taxidermy flesh removal system, hereinafter system, is generally indicated by reference numeral 1. The system 1 may include a system container 2. The system container 2 of the system 1 may include a container wall 3 which in some embodiments may be generally cylindrical. In other embodiments, the container wall 3 may have other configurations. A container bottom 4 may be provided on the container wall 3. The container wall 3 and the container bottom 4 may together define a container interior 5 of the system container 2. The container interior 5 of the system container 2 may be adapted to contain a supply of electrically-conductive liquid 18 for purposes which will be hereinafter described. In some embodiments, the electrically-conductive liquid 18 may include water. In other embodiments, the electrically-conductive liquid 18 may be any other liquid which is suitable for transmitting an electrical current. A container handle 6 may be provided on the container wall 3 for portability purposes. The container wall 3 and the container bottom 4 of the system container 2 may be plastic or other electrically-insulating material.

An electrode assembly 10 may be provided in the container interior 5 of the system container 2. In some embodiments, the electrode assembly 10 may include an electrode housing 11 having an electrode housing opening 12 which communicates with the container interior 5. A positive electrode 13 and a negative electrode 13*a* may be provided in the electrode housing 11 in spaced-apart relationship with respect to each other. A power cord 14 may be disposed in electrical communication with the positive electrode 13 and the negative electrode 13*a*. In some embodiments, a plug 15 may terminate the power cord 14. The plug 15 may be adapted for insertion into a standard 120-volt electrical outlet (not illustrated) or other electrical power source to provide a supply of electrical current to and establish an electrical potential between the positive electrode 13 and the negative electrode 13*a* of the electrode assembly 10. In other embodiments, the power cord 14 may be hard-wired to an electrical power source (not illustrated). In some embodiments, a switch (not illustrated) may be provided in the power cord 14 to selectively establish and terminate flow of electrical current to the electrode assembly 10. The positive electrode 13 and the negative electrode 13*a* may be selected such that the voltage of the electrical potential which is established there between is from about 100 volts to about 120 volts. The electrical current may be in the range of about 2.1~6.0 amps. The electrode assembly 10 may be provided in any location or position in the container interior 5 of the system container 2. In some embodiments, the electrode housing 11 of the electrode assembly 10 may be provided on the container bottom 4 of the system container 2, as illustrated.

In typical application, the system 1 is used to remove soft tissue flesh (not illustrated) from a head (not illustrated) or other body part of a game carcass or other animal carcass in preparation of the head for display. The flesh which is removed from the head may include the hide, skin, musculature, fat and other soft tissues which require removal from the skull prior to completing preparation of the head for display. Accordingly, a supply of the electrically-conductive liquid 18 is placed in the container interior 5 of the system container 2. The electrically-conductive liquid 18 fills both the container interior 5 of the system container 2 and the electrode housing 11 of the electrode assembly 10. The head may be removed from the body of the animal carcass using conventional taxidermy decapitation techniques. After the brains (not illustrated) are removed from the skull of the severed head, the head is submerged in the electrically-conductive liquid 18 in the container interior 5. In some embodiments, the plug 15 on the power cord 14 is inserted into an electrical outlet (not illustrated) to facilitate flow of electrical current through the power cord 14 to the positive electrode 13 and the negative electrode 13*a* of the electrode assembly 10. An electrical potential of from typically about 100 volts to about 120 volts is established between the positive electrode 13 and the negative electrode 13*a*. The electrically-conductive liquid 18 which fills the space between the positive electrode 13 and the negative electrode 13*a* conducts the electrical current, which flows through the electrically-conductive liquid 18. The electrically-conductive liquid 18 may remain at or near room temperature throughout the process.

The electrical current may be continuously applied to the electrically-conductive liquid 18 through the electrode assembly 10 for a time period of about 4 hours. Throughout the process, the electrical current which flows through the electrically-conductive liquid 18 is continuously applied to the hide and flesh on the severed skull of the animal carcass. The electrical current initially loosens and removes the hide from the underlying muscles and other connective tissue and then progressively removes most of the muscles and other soft connective tissue from the skull After a period of typically at least about four hours, the skull of the game carcass may be removed from the electrically-conductive liquid 18. Any residual hide, muscles and/or other connective tissue which remains on the skull may be removed such as by using pressurized water ejected from a hose (not illustrated), for example and without limitation. Subsequent steps of preparing the head for display may include selecting an artificial form (not illustrated) to apply antlers and/or horns; attaching the form to the skull; and covering the skull with artificial hair or fur, glass eyes, facial features, whiskers, eyelashes and ears to replicate or simulate the appearance of the game animal, according to the knowledge of those skilled in the art.

Figure 2:
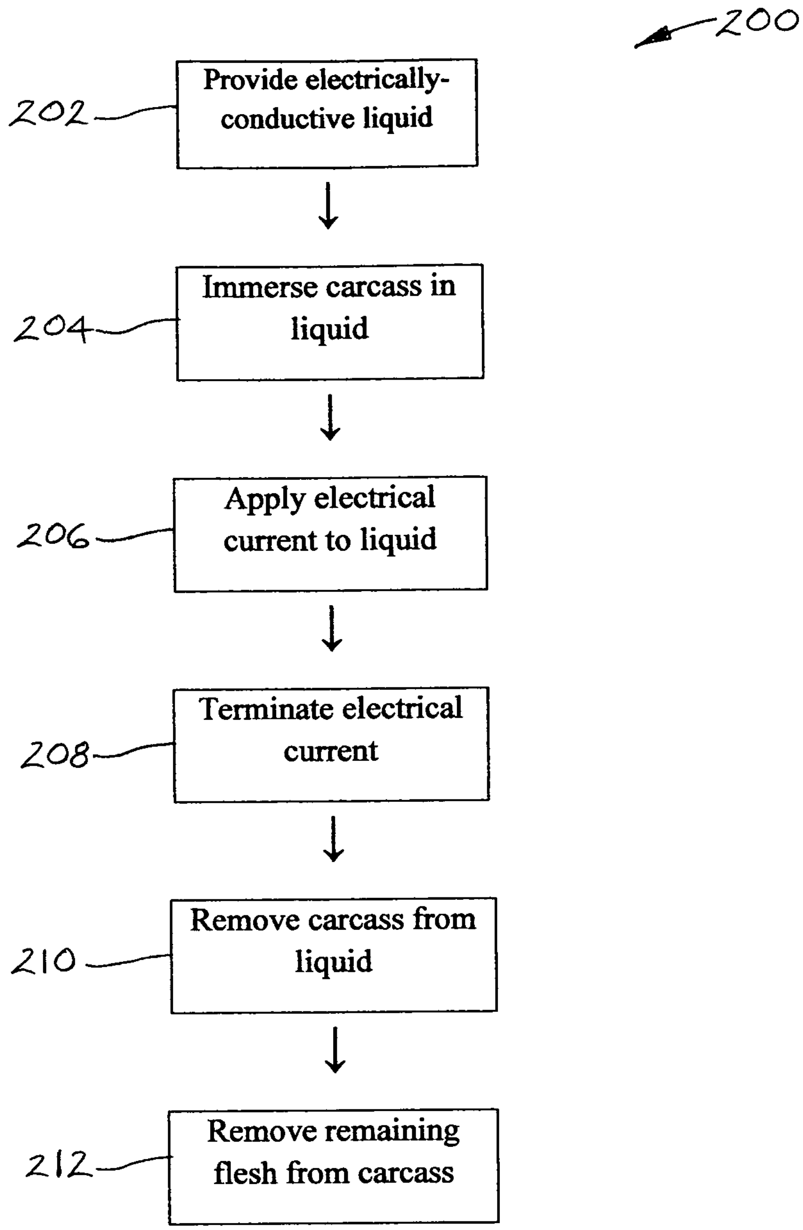
FIG. 2 is a flow diagram of an illustrative embodiment of the taxidermy flesh removal method.

Referring next to FIG. 2 of the drawings, a flow diagram of an illustrative embodiment of a taxidermy flesh removal method is generally indicated by reference numeral 200. In block 202, an electrically-conductive liquid is provided. In some embodiments, the electrically-conductive liquid may include water. In other embodiments, the electrically-conductive liquid may be any type of liquid which transmits an electrical current. In block 204, a head or other body part of an animal carcass is submerged in the electrically-conductive liquid. In block 206, an electrical current is applied to the electrically-conductive liquid. In some embodiments, the electrical current may have a voltage of about 100~120 volts and may be about 2.1~6.0 amps. In block 208, the electrical current may be terminated after a selected period of time. In some embodiments, the electrical current may be terminated after a period of at least about 4 hours. In block 210, the carcass head or other body part is removed from the electrically-conductive liquid. In block 212, in some applications, residual flesh may be removed from the head or other body part of the game carcass using pressurized water, for example and without limitation.

It will be appreciated by those skilled in the art that the taxidermy flesh removal system and method of the disclosure facilitates safe and efficient removal of hide, skin, musculature, fat and other soft tissues from the skull or other body part of a game carcass. Moreover, because the electrically-conductive liquid may remain at or near room temperature throughout the flesh removal process, thermally-induced damage to the skull of the game carcass may be eliminated or minimized. Referring again to FIG. 1 of the drawings, the size or volume of the container interior 5 of the system container 2 may be selected to accommodate different-sized heads of a variety of game animals to be prepared for mounting and display using taxidermy techniques.

While illustrative embodiments of the disclosure have been described above, it will be recognized and understood that various modifications can be made and the appended claims are intended to cover all such modifications which may fall within the spirit and scope of the disclosure.

What is claimed is:

1. A taxidermy flesh removal system, comprising:

a taxidermy flesh removal system container sized to contain a head of a game carcass;

an electrode assembly provided in said system container and having a positive electrode and a negative electrode spaced-apart from said positive electrode; and the positive electrode and the negative electrode of the electrode assembly establishing an electrical potential of at least 100 volts.

2. The system of claim 1 further comprising a power cord electrically connected to said positive electrode and said negative electrode of said electrode assembly.

3. The system of claim 2 further comprising a plug terminating said power cord.

4. The system of claim 1 further comprising a handle carried by said system container.

5. The system of claim 1 wherein said system container comprises a container wall and a container bottom closing said container wall.

6. The system of claim 5 wherein said container wall is cylindrical.

7. The system of claim 1 wherein said electrode assembly comprises an electrode housing having an electrode housing opening communicating with said system container, and wherein said positive electrode and said negative electrode of said electrode assembly are provided in said electrode housing.

8. The system of claim 1 wherein said system container comprises a container wall and a container bottom closing said container wall, and wherein said electrode assembly is carried by said container bottom.

9. A taxidermy flesh removal system, comprising:

a taxidermy flesh removal system container having a container wall, a container bottom closing said container wall and a container interior defined by said container bottom and said container wall and sized to contain a head of a game carcass;

an electrode assembly provided in said container interior of said system container and including an electrode housing having an electrode housing opening communicating with said container interior and a positive electrode provided in said electrode housing and a negative electrode spaced-apart from said positive electrode in said electrode housing;

the positive electrode and the negative electrode of the electrode assembly establishing an electrical potential of at least 100 volt and 2.1-6 amps; and an electrically-conductive liquid provided in said container interior of said system container.

10. The system of claim 9 wherein said electrically-conductive liquid comprises water.

11. The system of claim 9 further comprising a power cord electrically connected to said positive electrode and said negative electrode of said electrode assembly.

12. The system of claim 11 further comprising a plug terminating said power cord.

13. The system of claim 1 further comprising a handle carried by said system container.

14. The system of claim 9 wherein said container wall of said system container is cylindrical.

* * * * *